Patented Jan. 17, 1933

1,894,925

UNITED STATES PATENT OFFICE

JOSEF VARGA, OF BUDAPEST, HUNGARY, ASSIGNOR TO DEUTSCHE GOLD- UND SILBER-SCHEIDEANSTALT VORMALS ROESSLER, OF FRANKFORT-ON-THE-MAIN, GERMANY, A CORPORATION OF GERMANY

HYDROGENATION OF NAPHTHALENE

No Drawing. Application filed October 3, 1929, Serial No. 397,168, and in Germany October 13, 1928.

This application has been filed in Germany on October 13, 1928.

In the treatment of naphthalene with hydrogen at high temperatures in the presence of catalysts, primary hydrogenation products of the naphthalene are first formed, such as tetrahydronaphthalene (tetralene) and decahydronaphthalene (decalene). When known processes are employed, however, these are mostly again converted more or less thoroughly, into other products immediately, for example, into hydrocarbons of the benzene series.

In British Patent 253,507 of Kling and Florentin a process is described for example in which the treatment is carried out at temperatures between 350° and 460° C. at increased pressure with the use of halogenides, particularly chlorides of alkali earth metals, earth metals of the aluminium or iron group. When employing catalytic mixtures of iron chloride and aluminium chloride according to the statements of this patent by the action of hydrogen for two and a half hours on the naphthalene, 60 per cent of the naphthalene employed was converted into a light oil, the main portion of which distilled off between 100 and 200° C. In the absence of catalysts or by employing other catalysts than the halogenides mentioned above, only about 30 per cent of the naphthalene was converted into a liquid product, according to the statements of the British patent, and which in this case in the main consisted of tetrahydronaphthalene.

According to Swiss Patent 123,330 and Swiss Patent of Addition 127,689, naphthalene is treated at temperatures of 200 to 500° C. in the presence of catalysts at a desired pressure with water vapour or hydrogen or gaseous mixtures containing hydrogen. In this case dehydrogenating elements were recommended as catalysts, for example, nickel, cobalt, and iron, and again dehydrogenating oxides, for example, oxides of molybdenum, vanadium, tungsten, manganese and chromium, in certain cases in conjunction with activators such as, for example, oxides of zinc, cadmium, uranium, thorium, zirconium and beryllium. Insofar as the catalysts employed did not already contain oxides of chromium, molybdenum, tungsten and vanadium, these oxides could be added to the catalysts in small quantities to serve as activators. Contact poisons, particularly sulphur, are to be avoided as much as possible before the hydrogenating of the naphthalene, according to the statements in the patent. In addition to unchanged naphthalene liquid hydrocarbons were obtained as products of the reaction and consisted mainly of benzol, toluol and xylol and moreover saturated gaseous hydrocarbons.

According to British specification No. 283,600, cyclic compounds, including among others naphthalene, are hydrated at temperatures above 300° with a reduced pressure, normal pressure or slightly raised pressure, with the help of hydrogen in the presence of mixed catalysts. Especially for producing benzene and its next homologues, the following are suitable as mixed catalysts:—iron, cobalt, nickel, molybdenum, vanadium, tungsten, manganese, or chromium, or compounds of such or mixtures of the said metals or their compounds. Further, copper, silver, gold, zinc, cadmium, uranium, niobium, platinum, and the like may be used. Here also the removal of contact poisons as, for example, sulphur, before the hydrogenation is recommended.

One object of the present invention is to carry out the hydrogenation of naphthalene so that substantially only the primary hydration products of naphthalene are obtained as reaction products, and further splitting up of the naphthalene is avoided.

If naphthalene is subjected to heating under pressure with hydrogen in the presence of suitable catalysts, on attaining certain temperatures, a sudden fall in temperature takes place, which corresponds to an absorption of heat by the naphthalene of at least 3,000 to 4,000 calories per gram molecule. Thereupon, in the presence of sufficient amounts of hydrogen, a further considerable rise in temperature takes place, for example, a rise of 100° C. and more. The critical temperature at which the sudden fall takes place in general lies within narrow limits, which again are dependent upon the working conditions. In the presence of molybdenum and tungsten compounds, the critical temperature generally occurs within the limits of 460 and 500°. When working with tungstic acid as a catalyst with a partial pressure of hydrogen of about 250 atmospheres, the critical temperature occurs, for example, at about 480°. This critical temperature may be conveniently referred to as the sudden fall temperature.

With the object of promoting the production of primary hydrogenation products, such as tetralene and decalene, the novel process is carried out so that temperatures which are slightly below the critical temperature point are maintained. If the critical temperature point, for example, occurs at 480° C., the process may be carried out with advantage at about 460° C. The hydrogenation process should only be carried so far as is necessary for the formation of primary products of hydrogenation with the highest possible yield. In carrying the process further over a period which may be ascertained easily by preliminary experiments, splitting up of the primary hydrogenation products has been found to occur even if the operation is carried out under the above-mentioned rule, that is even if the temperature is kept below the critical temperature point.

It has furthermore been found that the process can be influenced to a far-reaching extent in the direction of forming the definite desired products by selecting the amount of hydrogen. For example, the formation of decahydronaphthalene is promoted by high partial pressures of hydrogen, for example, such as amount to 95 to 97 per cent of the total pressure, which is about a ratio of 4 parts by weight of hydrogen to 10 parts of the naphthalene. Comparatively lower partial pressures of hydrogen, for example, such as 75 to 80 per cent of the total pressure (corresponding to a ratio of about 2.5 parts of hydrogen to 10 parts of naphthalene) on the other hand, promote the formation of tetrahydronaphthalene.

It has furthermore been found that among the many catalysts which have been hitherto recommended for carrying out the hydrogenation of naphthalene, compounds of molybdenum and tungsten, for example, molybdic acid, tungstic acid, molybdates, tungstates and so forth, occupy a special position insofar as they present in conjunction with definite other catalysts the possibility of enabling the treatment of naphthalene in the production of tetralene and decalene to be carried out with very special advantages. The term molybdenum catalyst hereinafter used denotes molybdenum compounds such as molybdic acid, molybdates, etc., as well as molybdenum itself or substances containing molybdenum or molybdenum compounds.

Hydrogen sulphide or compounds or bodies which are capable, under the conditions of working, of yielding hydrogen sulphide, as, for example, sulphur, have been found to be suitable as additional catalysts. By the co-operation of hydrogen sulphide with molybdenum compounds or tungsten compounds, or also with the metals molybdenum and tungsten, the naphthalene is converted extraordinarily quickly when high pressures and suitably selected high temperatures are employed, and the desired primary products of hydrogenation are produced in very high yields, and, in fact, products are directly produced which are distinguished by a high degree of purity.

It has, in fact, already been incidentally proposed to carry out hydrogenation in the presence of catalysts which contain combined sulphur, as, for example, iron sulphide, molybdenum sulphide, and the like; in some cases in such a way that the sulphides in question, by the interaction of metals or metal oxides on the one hand, and sulphur or suitable sulphur compounds on the other hand, are produced at the beginning of the hydrogenation process. Further, it has also been occasionally proposed to use gaseous mixtures containing hydrogen for carrying out the hydrogenation processes, and which contain admixtures of, for example, carbon monoxide, hydrogen sulphide, methane, water vapour or the like.

From such proposals, however, it could not be deduced in any event that hydrogen sulphide in combination with certain particular other catalysts, namely molybdenum or tungsten compounds, could present a catalytic combination the action of which considerably exceeds in various directions the results obtainable with molybdenum and tungsten compounds alone. This new experience is all the more surprising since hitherto in the hydrogenation of naphthalene, sulphur and sulphur compounds have been regarded precisely as contact poisons which according to known proposals ought to be removed as far as possible before commencing the hydrogenation process.

For producing this catalytic combination effect, it is not sufficient that the hydrogen sulphide is substantially present or in desired amounts; rather the amounts of hydrogen sulphide must be so determined that the catalytic action of the remaining catalysts (molybdenum or tungsten compounds), is improved. In general, for the production of the combination effect, 1 to 10 parts, and preferably 2 to 5 parts, of hydrogen sulphide to 100 parts of naphthalene are necessary. The most suitable proportion for any particular case can be easily ascertain by previous experiment.

Moreover, it is important, in order to obtain the results of the present invention, to use the correct amounts of hydrogen, the correct high pressure, and in particular the correct temperature. The hydrogen is preferably employed in considerable excess, for example, so that it amounts to several times the amount consumed in the reaction. While in the known process first mentioned above insofar as it mentions catalysts containing molybdenum and tungsten compounds, it is stated that, as regards the pressure, it is possible to work at any desired pressure or at normal pressure or at reduced or slightly increased pressures, but the present invention requires high pressures, preferably pressures above 100 atmospheres, for example, pressures between 100 to 500 atmospheres. The hydrogen is suitably employed in considerable excess, for example, such that it amounts to a number of times the amount consumed in the reaction.

The process may be carried out discontinuously or continuously with a flowing stream of gas. In the latter case, care has to be taken that the ratios of the amounts of naphthalene, hydrogen and hydrogen sulphide present during the reaction, as well as the speed of flow of the mixture of gas and vapour, remain constant during the reaction so that the content of hydrogen sulphide during the process is maintained within the limits favourable for the reaction.

A special advantage of the process consists in the fact that the direct treatment of crude naphthalene containing sulphur can be effected so that the purification of this starting material hitherto usual can be omitted. The sulphur content of the crude naphthalene must be taken into account in such a way that the optimum amount necessary for the combination effect of the hydrogen sulphide and the catalyst is retained.

*Example*

Naphthalene is heated for one minute at 460° C. with the addition of 4 per cent sulphur and 2 per cent molybdic acid with hydrogen with an initial pressure of 120 atmospheres.

The partial pressure of the hydrogen amounts to 95 to 97 per cent of the total pressure. A reaction product of specific gravity 0.947 is obtained which contains 49 per cent of decahydronaphthalene and 44 per cent of tetrahydronaphthalene. By increasing the naphthalene content above the amount mentioned above, the yield in tetrahydronaphthalene may be increased to such an extent, for example, that the final product contains 63 per cent of tetrahydronaphthalene and 31 per cent of decahydronaphthalene.

I claim:

1. A process for the production of primary hydrogenation products of naphthalene which consists in treating naphthalene in the presence of molybdenum catalysts with an excess of hydrogen at increased pressures and at temperatures below the sudden fall temperature, hydrogen sulphide being present in amount sufficient to increase the catalytic effect of the catalysts used.

2. A process for the production of primary hydrogenation products of naphthalene which consists in treating the naphthalene at increased pressures with an excess of hydrogen in the presence of molybdenum catalysts, there being present a sufficient quantity of hydrogen sulphide to increase the catalytic effect of the catalysts, the reaction mixture being heated up to temperatures immediately below the sudden fall temperature, additional naphthalene and hydrogen for the reaction being continuously added.

3. A process as claimed in claim 1 in which the pressure at which the process is carried out exceeds 100 atmospheres.

4. A process as claimed in claim 1 in which the pressure at which the process is carried out exceeds 100 atmospheres, and the temperature is about 20° C. below the sudden fall temperature.

5. A process as claimed in claim 1 in which for every 100 parts of naphthalene present in the reaction mixture, there is present from 1 part to 10 parts of hydrogen sulphide.

6. A process as claimed in claim 1 in which the time allowed for the reaction is limited in order to present subsequent splitting of the initially formed primary hydrogenation products of naphthalene.

7. A process as claimed in claim 1 in which the partial pressure of the hydrogen exceeds 75% of the total pressure.

8. A process as claimed in claim 1 in which the partial pressure of the hydrogen exceeds 95% of the total pressure.

9. A process as claimed in claim 1 in which naphthalene containing its original sulphur content is utilized, and in which the amount of hydrogen sulphide present during the reaction is carefully kept within the limits of from 1% to 10% so that the action of the metallic catalyst is improved.

10. A process for the production of primary hydrogenation products of naphthalene which comprises the step of leading naphthalene and an excess of hydrogen over a molybdenum catalyst at an increased pressure, there being present in the reaction mixture hydrogen sulphide in amount within, the limits of from 1% to 10% so that the action of the molybdenum catalyst is improved, the mixture of naphthalene, hydrogen, and hydrogen sulphide being heated to temperatures at which the hydrogenation occurs, these temperatures being below the sudden fall temperature.

11. A process as claimed in claim 1 in which the operating temperature does not exceed 480° C.

12. A process as claimed in claim 10 in which the temperature of the reaction mixture led over the molybdenum catalyst is maintained at substantially 460° C.

JOSEF VARGA.